US006704507B2

(12) United States Patent
Nakano et al.

(10) Patent No.: US 6,704,507 B2
(45) Date of Patent: Mar. 9, 2004

(54) OPTICAL RANGE FINDER

(75) Inventors: Ryuzo Nakano, Tokyo (JP); Kouichi Kubo, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 6 days.

(21) Appl. No.: 10/329,340

(22) Filed: Dec. 27, 2002

(65) Prior Publication Data

US 2003/0123868 A1 Jul. 3, 2003

(30) Foreign Application Priority Data

Dec. 28, 2001 (JP) ........................................ 2001-400174

(51) Int. Cl.[7] .............................. G03B 13/36; G01C 3/08
(52) U.S. Cl. ..................................... 396/106; 356/3.01
(58) Field of Search .................. 396/106; 356/3.01–3.09

(56) References Cited

U.S. PATENT DOCUMENTS

| | | | | |
|---|---|---|---|---|
| 4,313,654 A | * | 2/1982 | Matsui et al. | ................ 396/106 |
| 4,460,259 A | * | 7/1984 | Greivenkamp et al. | ....... 396/75 |
| 4,740,676 A | * | 4/1988 | Satoh et al. | ............. 250/201.4 |
| 4,828,383 A | * | 5/1989 | Kunishige et al. | ......... 356/3.04 |
| 5,099,112 A | * | 3/1992 | Kamitani et al. | ........ 250/201.6 |
| 5,461,451 A | * | 10/1995 | Seki et al. | .................. 396/106 |
| 5,488,468 A | * | 1/1996 | Kawanishi et al. | ........ 356/4.01 |
| 5,719,663 A | * | 2/1998 | Hirai et al. | ................. 356/3.03 |
| 5,812,893 A | * | 9/1998 | Hikita et al. | ................ 396/106 |
| 5,825,473 A | * | 10/1998 | Kodaira | ...................... 356/3.04 |
| 5,870,636 A | * | 2/1999 | Sugita et al. | ............... 396/106 |
| 5,956,534 A | * | 9/1999 | Onda | ......................... 396/106 |
| 6,504,600 B2 | * | 1/2003 | Kawaguchi et al. | ....... 356/4.01 |

FOREIGN PATENT DOCUMENTS

| | | |
|---|---|---|
| JP | 11-133293 | 5/1999 |
| JP | 11-305111 | 11/1999 |
| JP | 2000-89095 | 3/2000 |
| JP | 2000-347098 | 12/2000 |
| JP | 2001-33237 | 1/2001 |

* cited by examiner

Primary Examiner—W. B. Perkey
(74) Attorney, Agent, or Firm—Nixon Peabody, LLP

(57) ABSTRACT

An optical range finder is provided with a projection unit for projecting luminous flux to an object located in an optical axis direction, a detection unit for receiving the luminous flux returned from the object, a holding frame housing the projection unit and the detection unit, and a support substrate on which the holding frame is supported. The holding frame has a partition wall for separating the detection unit and the projection unit from each other. An end of the partition wall is provided with a tip protruding from a bottom of the holding frame. In the support substrate, a groove is formed in a surface side which comes in contact with the bottom of the holding frame to be engaged with the tip of the partition wall. Light leaked from the projection unit through a thickness of the support substrate to the detection unit is shut off by a combination of the tip and the groove.

3 Claims, 10 Drawing Sheets

OPTICAL RANGE FINDER

BACKGROUND OF THE INVENTION

1. [Technical Field of the Invention]

The present invention relates to an optical range finder. More specifically, the invention relates to a mounting structure of a compact optical range finder incorporated in a camera or the like to be used for automatic focus adjustment.

2. [Prior Art]

A compact optical range finder mounted on a camera or the like is basically provided with a projection unit, a detection unit, a holding frame, and a support substrate to measure a distance to an object in an optical axis direction. The projection unit projects luminous flux to the object located in the optical axis direction. The detection unit receives the luminous flux returned from the object. The holding frame is made of a molded article or the like, and integrally incorporates the projection unit and the detection unit. The protective holding frame is mounted on the support substrate, and a necessary electronic component such as an IC is attached to the support substrate.

The projection unit is constituted of a lens, a light emitting element, and a backside substrate. The lens is mounted to a front side of the holding frame to converge the luminous flux in the optical axis direction. The light emitting element is constituted of an infrared LED or the like to emit luminous flux to the lens. The backside substrate is mounted to the holding frame to shield the light emitting element from the back side. On the other hand, the detection unit is constituted of a lens, a light receiving element, and a backside substrate. The lens is mounted to the front side of the holding frame to converge the luminous flux returned from the object. The light receiving element is incorporated in the holding frame to receive the luminous flux. The backside substrate is mounted to the holding frame to shield the light receiving element from the back side. Various developments have been made on the camera optical range finder having such a constitution, and mounting structures thereof are disclosed in Japanese Patent Application Laid-Open No. Hei 11 (1999)-133293, Japanese Patent Application Laid-Open No. Hei 11 (1999)-305111, Japanese Patent Application Laid-Open No. 2000-89095, Japanese Patent Application Laid-Open No. 2000-347098, Japanese Patent Application Laid-Open No. 2001-33237, and the like.

The light emitting element and the light receiving element are incorporated in the holding frame, and both are covered with the backside substrates. Accordingly, a constitution is adopted where basically no light leakage occurs from the light emitting element to the light receiving element. However, as there is slight light leakage from the light emitting side to the light receiving side through the support substrate on which the holding frame is mounted, deterioration of measuring accuracy is brought about, which causes an error. A most part of the light emitted from the light emitting element is projected through the lens of the front side to the object. However, there is leaked light, a part of which is leaked through a terminal of the light emitting element to the support substrate and, further, through a thickness part and a surface part of the support substrate to reach the light emitting element. Conventionally, it has been difficult to completely shut off such a leaked light, or much work time and labor have been required for complete shutting-off.

The light emitting element is attached to the holding frame made of the resin molded article. The unit of the light emitting element is inserted into an opening formed beforehand in the holding frame to carry out automatic positioning, and set a predetermined parallax relative to the opposite lens. However, at a point of time when the light emitting element is inserted, it is impossible to check whether the element is surely set in a predetermined position or not. Conventionally, after assembling of the optical range finder, actual measurement has been carried out to check a position of the light emitting element. Since the position of the light emitting element cannot be visually checked at an assembling stage, the impossibility of checking has been an obstacle to work.

SUMMARY OF THE INVENTION

In order to solve the foregoing technical problems, the following means has been contrived. That is, the prevent invention has three aspects. According to a first aspect, there is provided an optical range finder for measuring a distance to an object in an optical axis direction, comprising a projection unit for projecting luminous flux to the object located in the optical axis direction, a detection unit for receiving the luminous flux returned from the object, a holding frame that holds therein the projection unit and the detection unit, and a support substrate that supports thereon the holding frame, wherein the projection unit comprises a light emitting element for emitting the luminous flux in the optical axis direction, and a backside substrate fixed to the holding frame to shield the light emitting element from a backside, the detection unit comprises a light receiving element mounted in the holding frame to receive the luminous flux returned from the object, and another backside substrate fixed to the holding frame to shield the light receiving element from a backside, the holding frame has a partition wall for separating the detection unit and the projection unit from each other, an end of the partition wall being provided with a tip protruding from a bottom of the holding frame, and the support substrate is formed with a groove in a surface of the support substrate which comes in contact with the bottom of the holding frame, such that the groove can be engaged with the tip of the partition wall so as to shut off a light leaked from the projection unit through a thickness of the support substrate to the detection unit by a combination of the tip and the groove.

According to a second aspect of the invention, there is provided an optical range finder for measuring a distance to an object in an optical axis direction, comprising a projection unit for projecting luminous flux to the object located in the optical axis direction, a detection unit for receiving the luminous flux returned from the object, a holding frame that holds therein the projection unit and the detection unit, and a support substrate that supports thereon the holding frame, wherein the projection unit comprises a light emitting element for emitting the luminous flux in the optical axis direction, and a backside substrate fixed to the holding frame to shield the light emitting element from a backside, the detection unit comprises a light receiving element mounted in the holding frame to receive the luminous flux returned from the object, and another backside substrate fixed to the holding frame to shield the light receiving element from a backside, the holding frame has a bottom which comes in contact with a surface of the support frame, and a bank part protruding from the bottom to surround the light emitting element housed in the holding frame, and the support substrate has a wiring pattern formed on the surface of the support substrate for electrical connection to the projection unit and the detection unit and a resist pattern selectively formed on the surface of the support substrate, such that at least one of the wiring pattern and the resist pattern is removed from an area aligned with the bank part so as to shut off a leak light traveling the surface of the support substrate from the projection unit to the detection unit.

According to a third aspect of the invention, there is provided an optical range finder for measuring a distance to an object in an optical axis direction, comprising a projection unit for projecting luminous flux to the object located in the optical axis direction, a detection unit for receiving the luminous flux returned from the object, a holding frame that holds therein the projection unit and the detection unit, and a support substrate that supports thereon the holding frame, wherein the projection unit comprises a light emitting element for emitting the luminous flux in the optical axis direction, and a backside substrate fixed to the holding frame to shield the light emitting element from a backside, the detection unit comprises a light receiving element mounted in the holding frame to receive the luminous flux returned from the object, and another backside substrate fixed to the holding frame to shield the light receiving element from a backside, and the holding frame is formed with an opening in a bottom of the holding frame which comes in contact with a surface of the support, the opening being provided for receiving therein the light emitting element and being formed with a guide part for serving as a visual positioning guide when the light emitting element is inserted through the opening into the holding frame.

According to the first aspect of the present invention, the tip of the partition wall formed in the holding frame to separate the projection unit and the detection unit is placed into the support substrate, whereby infiltration of light through a thickness of the substrate is prevented. According to the second aspect of the present invention, the bank part formed on the bottom of the holding frame is engaged with the wire or resist pattern formed on the surface of the support substrate, whereby light infiltrated from the projection unit side through the surface of the substrate to the detection unit side is shut off. Further, according to the third aspect of the present invention, the guide part serving a positioning marker when the light emitting element is inserted through the opening formed in the holding frame is formed beforehand in the opening. Thus, a position can be visually checked immediately after the light emitting element is incorporated. By implementing the above-described measures, it is possible to increase measurement accuracy of the optical range finder.

DETAILED DESCRIPTION OF THE INVENTION

Figure 1:
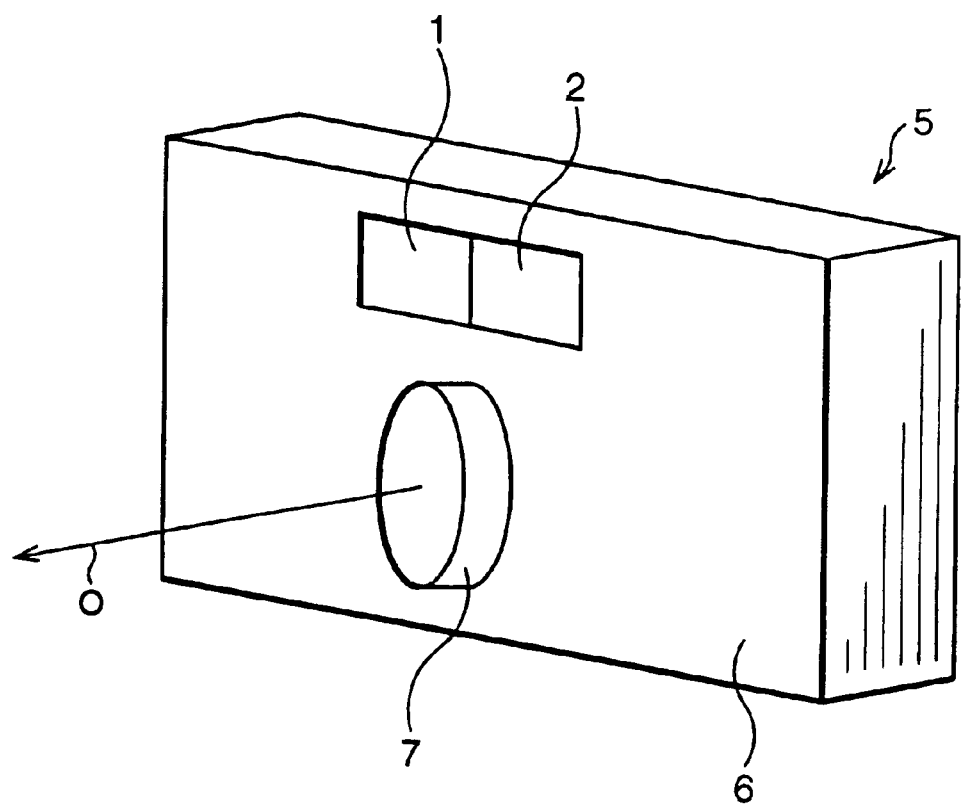
FIG. 1 is a perspective view showing an example of a camera integrating an optical range finder of the present invention.

Next, detailed description will be made of the preferred embodiments of the present invention with reference to the accompanying drawings. FIG. 1 is a schematic perspective view showing an example of a camera including an optical range finder of the present invention. As shown, a camera 5 is provided with a body 6 and a lens barrel 7. The optical range finder constituted of a projection unit 1 and a detection unit 2 is mounted to a front side of the body 6. This optical range finder measures a distance to an object in an optical axis direction O of the camera 5, and a result of the measurement is used for automatic focus adjustment or the like.

Figure 2:
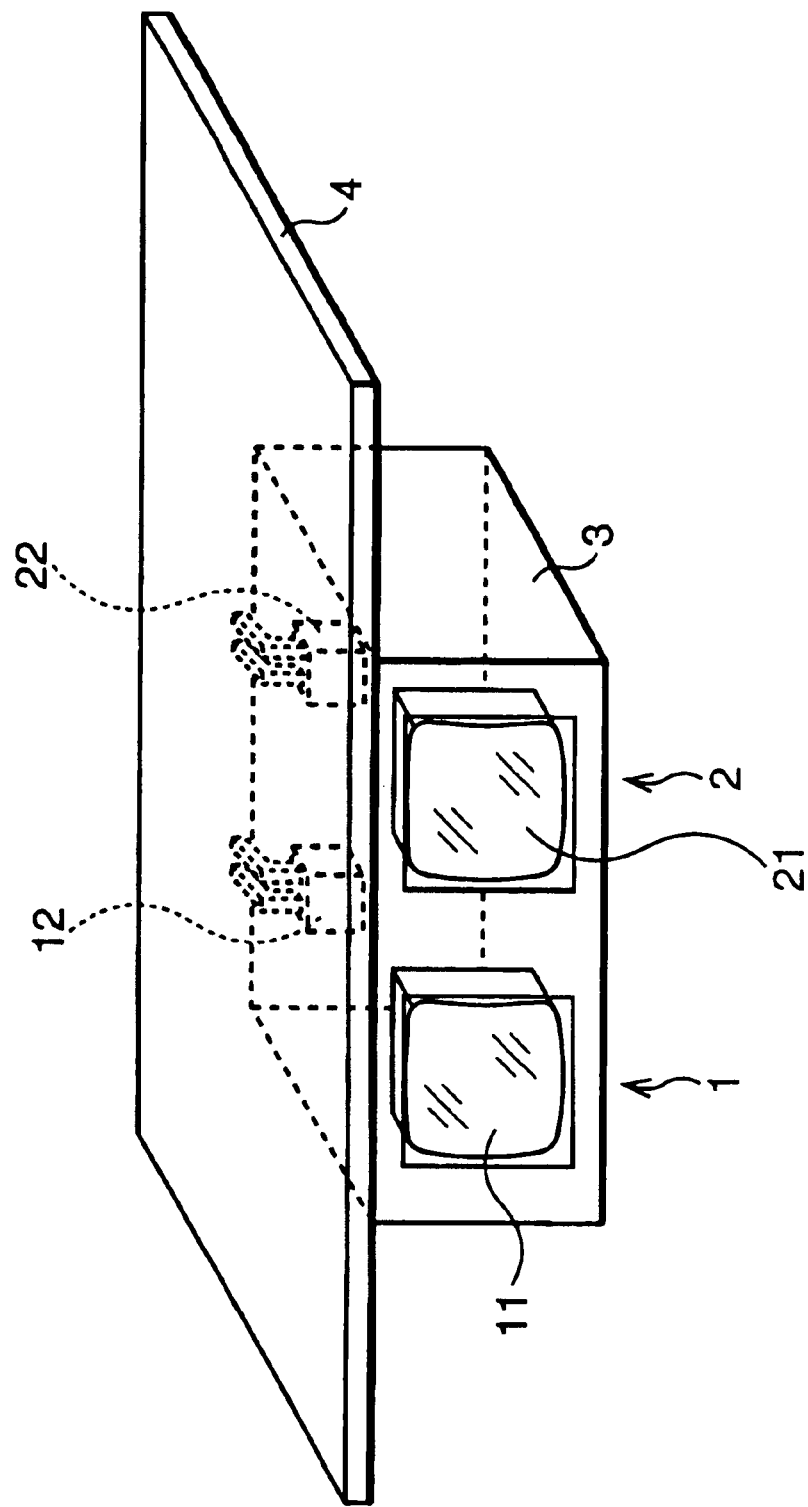
FIG. 2 is a perspective view showing the optical range finder of the present invention.

FIG. 2 is a schematic perspective view showing an entire constitution of the optical range finder of the present invention. As shown, the optical range finder is basically constituted of the projection unit 1, the detection unit 2, a holding frame 3, and a support substrate 4. The projection unit 1 projects luminous flux to an object located in an optical axis direction. The detection unit 2 receives the luminous flux returned from the object. The holding frame 3 is made of a resin molded article to integrally incorporate the projection unit 1 and the detection unit 2. The holding frame 3 is supported on the support substrate 4. The optical range finder is mounted through the support substrate 4 to the camera 5. The support substrate 4 supplies necessary operating voltage to the projection unit 1 and the detection unit 2, and transfers a control signal and a detection signal.

The projection unit 1 is constituted of a lens 11, a light emitting element 12, and a backside substrate (not shown). The lens 11 is mounted to a front side of the holding frame 3 to converge luminous flux in the optical axis direction. The light emitting element 12 is inserted into the holding frame 3 to emit luminous flux to the lens 11. A pair of connection terminals disposed in the light emitting element 12 is soldered to a wiring pattern on the support substrate 4. A backside substrate (not shown) is set upright to the support substrate, and mounted to the holding frame 3 to block the light emitting element 12 from the back. On the other hand, the detection unit 2 is constituted of a lens 21, a light receiving element 22, and a backside substrate (not shown). The lens 21 is mounted to the front side of the holding frame 3 to converge the luminous flux returned from the object. The light receiving element 22 is incorporated in the holding frame 3 to receive the luminous flux. A pair of connection terminals of the light receiving element 22 is soldered to the wiring pattern of the support substrate 4. A backside substrate (not shown) is mounted to the holding frame 3 to block the light receiving element 22 from the back. Though not shown, a partition wall is formed in the holding frame 3 to separate the projection unit 1 and the detection unit 2 from each other. Accordingly, infiltration of light emitted from the light emitting element 12 to the light receiving element 22 side is prevented.

Figure 3A:
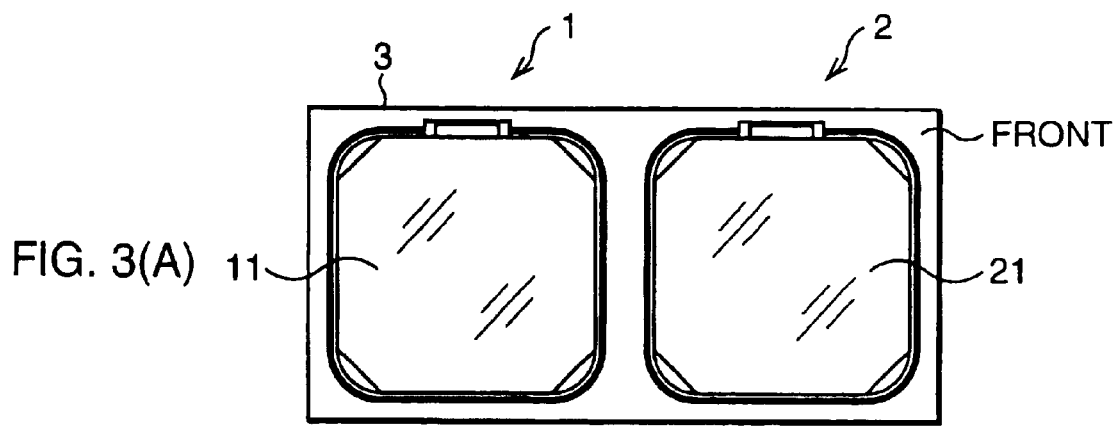
FIGS. 3(A), 3(B) and 3(C) are front, top and back views respectively showing the optical range finder of the present invention.
Figure 3B:
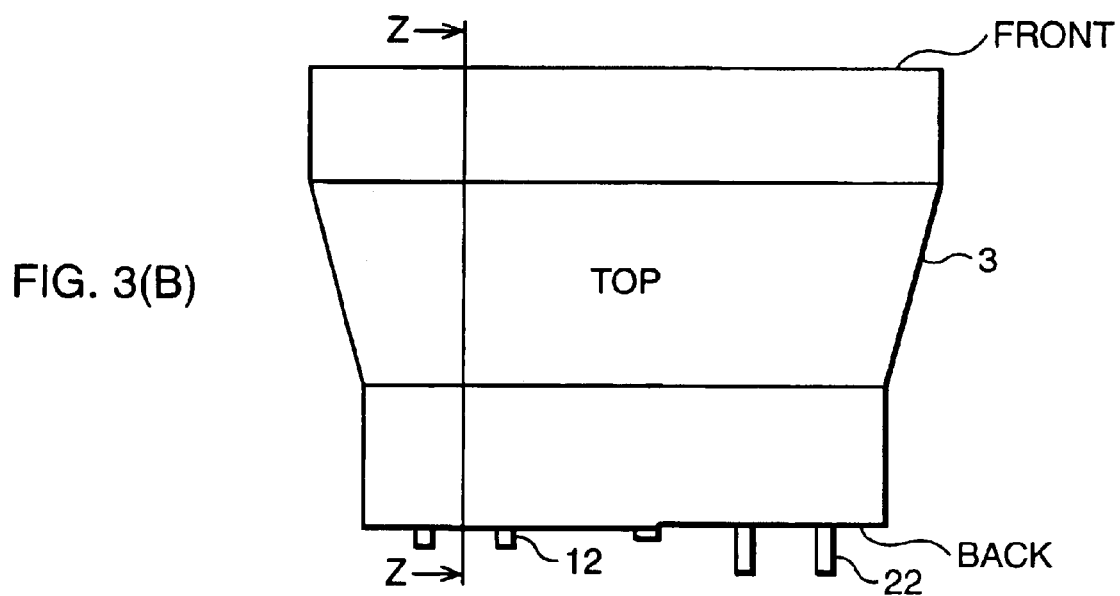
Figure 3C:
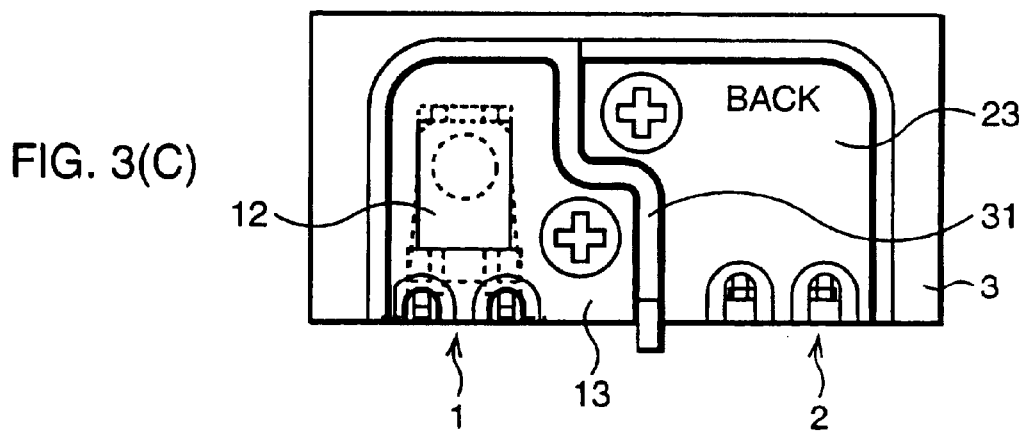

FIGS. 3(A) to 3(C) show a shape of the optical range finder of the present invention: FIG. 3(A) a front view, FIG. 3(B) a top view, and FIG. 3(C) a back view. In this specification, a side which comes in contact with the support substrate of the optical range finder is a bottom, and its opposite side is a top. As shown in the front view of FIG.

3(A), the projecting lens 11 and the collecting lens 21 are arranged in parallel on the front of the holding frame 3. As shown in the top view of FIG. 3(B), the holding frame 3 has a substantially trapezoidal shape, in which a long side is positioned on the front, and a short side is positioned on the back. The lenses are fitted in the front side as described above. The light emitting element 12 and the light receiving element 22 are mounted to the back side. In the drawing, connection terminals of the light emitting element 12 are projected from the back to be soldered to a support substrate side. Similarly, a pair of connection terminals of the light receiving element 22 is projected from the back of the holding frame to be soldered to the support substrate (not shown).

As shown in FIG. 3(C), a backside substrate 13 of the projection unit 1 and another backside substrate 23 of the detection unit 2 are respectively fitted on the back of the holding frame 3 made of the resin molded article. Paying attention to the projection unit 1, the light emitting element 12 inside is covered with the backside substrate 13 so that any light leakage can be basically prevented. However, the connection terminals of the light emitting element 12 are inserted into the backside substrate 13, through which light may possibly be leaked. In the holding frame 3, the partition wall 31 is formed to separate the projection unit 1 and the detection unit 2 from each other.

Figure 4:
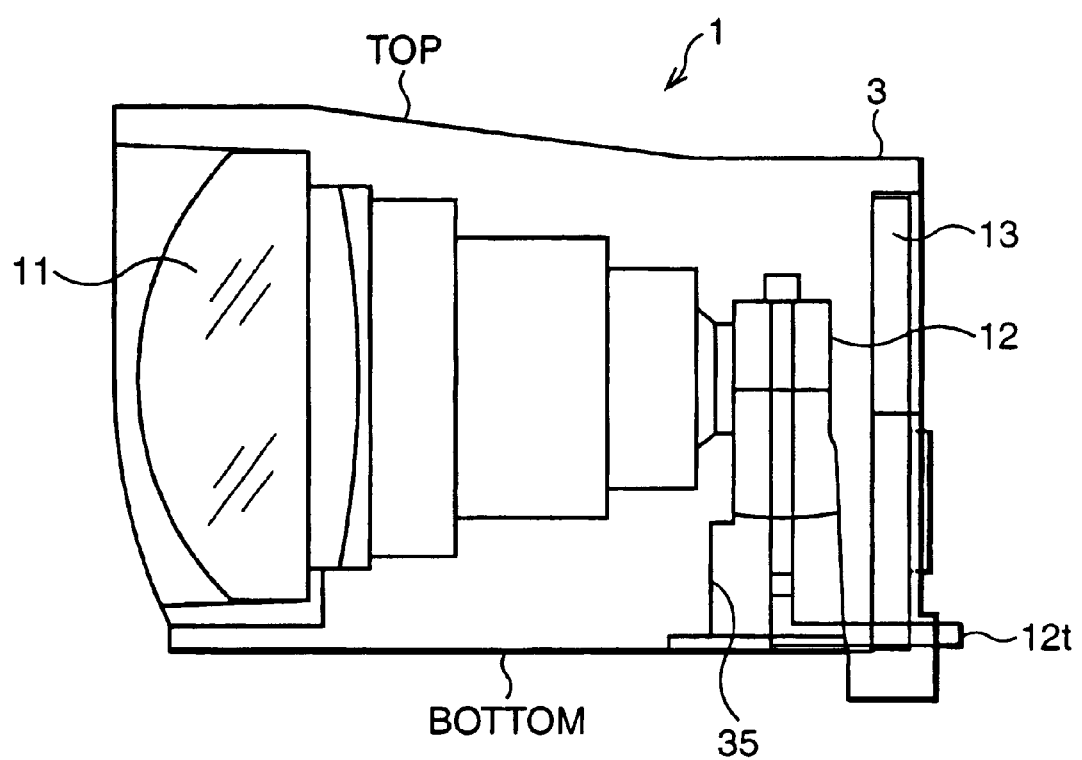
FIG. 4 is a sectional view of the optical range finder of the present invention.

FIG. 4 is a sectional view cut along the line Z—Z shown in FIG. 3(B), showing an internal structure of the projection unit 1. As shown, the lens 11 is mounted on the front side of the holding frame 3. The backside substrate 13 is mounted to the back side of the holding frame 3 by screws or the like. The light emitting element 12 is arranged between the lens 11 at the front side and the substrate 13 at the back side. The light emitting element 12 is inserted into the holding frame 3 through an opening 35 formed on the bottom of the holding frame 3. A pair of terminals 12t of the light emitting element is projected through the backside substrate 13 to the outside and soldered to the support substrate. When the light emitting element 12 is inserted into the opening of the holding frame 3, positioning must be executed to obtain predetermined parallax with respect to an optical axis of the lens 11. Normally, the light emitting element 12 is pushed in until the element 12 comes into contact with the holding frame 1 to execute automatic positioning. However, it may be difficult to determine whether the light emitting element is pushed in until the element comes into contact or not.

Figure 5:
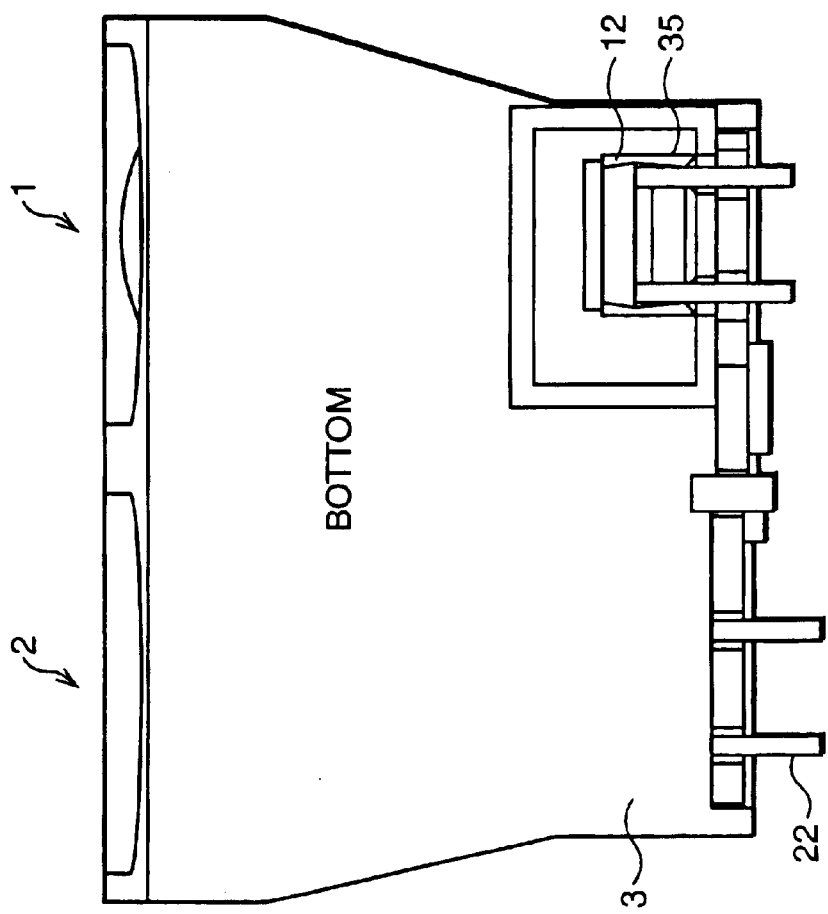
FIG. 5 is a bottom view of the optical range finder of the present invention.

FIG. 5 is a bottom view of the optical range finder of the present invention, making an opposite pair with the top view shown in FIG. 3(B). As described above, the light emitting element 12 is inserted into the inside through the opening 35 formed on the bottom of the holding frame 3.

Figure 6:
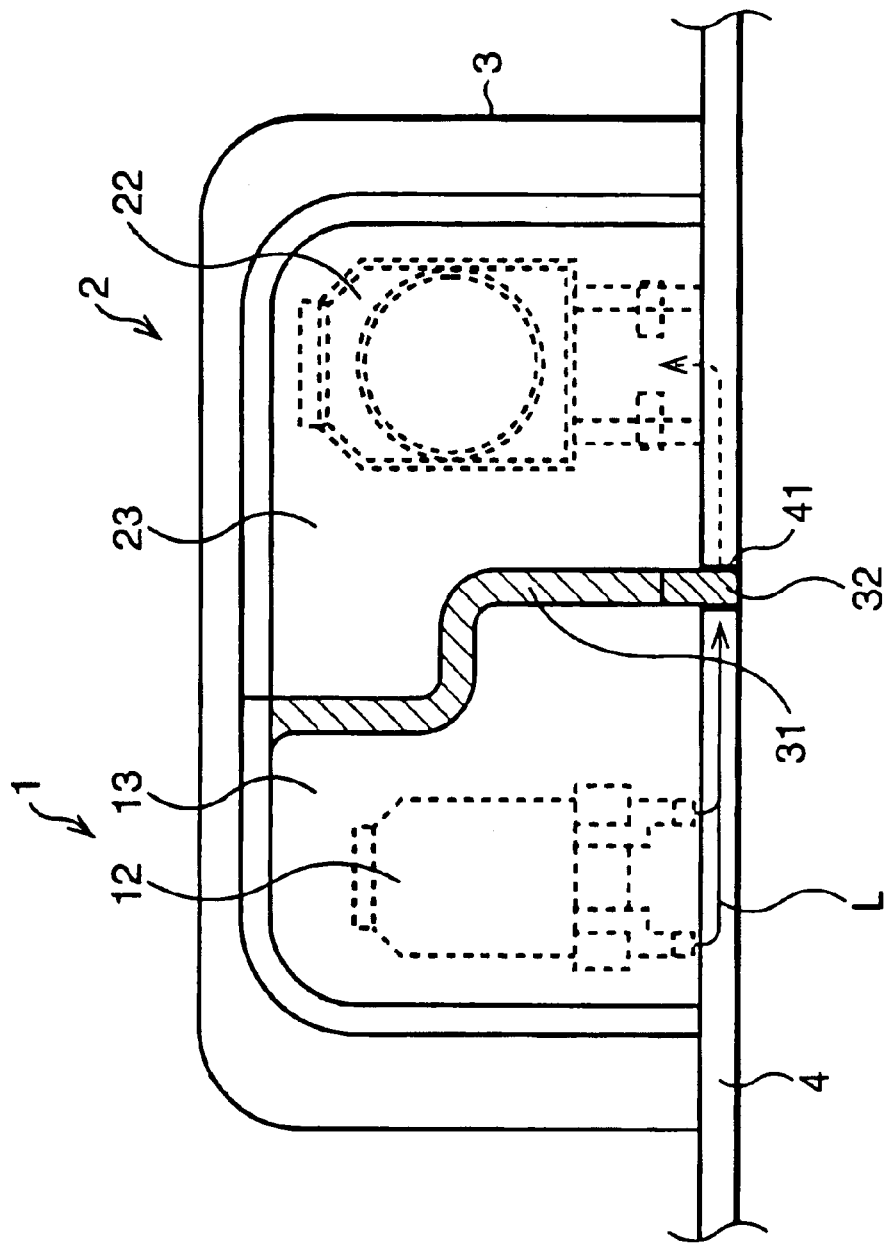
FIG. 6 is a schematic view showing a first aspect of the present invention.

FIG. 6 is a schematic view of the first aspect of the present invention, showing the optical range finder seen from the back side. As shown, the holding frame 3 is mounted on the support substrate 4. Here, the holding frame 3 has the partition wall 31 to separate the detection unit 2 and the projection unit 1 from each other. On the other hand, in the support substrate 4, a groove 41 is formed on the surface side which comes in contact with the bottom of the holding frame 3 and is engaged with the tip 32 of the partition wall 31. By a combination of the groove 41 and the tip 32, light L leaked from the projection unit 1 to the detection unit 2 through a thickness of the support substrate 4 made of a glass containing epoxy resin or the like having translucency is shut off. Thus, measurement accuracy of the optical range finder can be increased to remove errors caused by leaked light.

Figure 7:
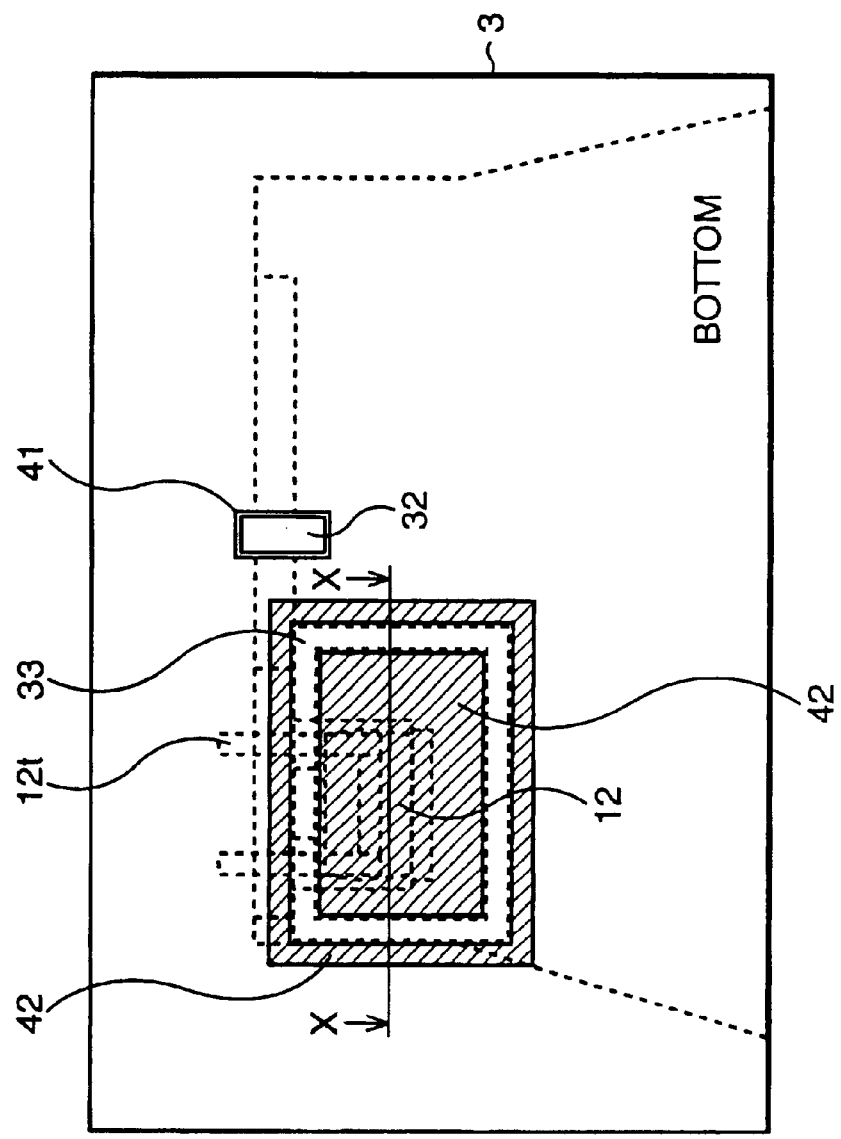
FIG. 7 is a schematic view showing a second aspect of the present invention.

FIG. 7 is a view of the second aspect of the present invention, showing the optical range finder seen from the bottom side. As shown, the bottom side of the holding frame 3 is in contact with the surface of the support substrate 4. On the bottom of the holding frame 3, a bank part 33 is formed in a rectangular shape to surround the light emitting element 12 housed in the holding frame 3. On the other hand, the support substrate 4 has a pattern 42 of a wiring, a resist or the like selectively formed on the surface of the substrate 4. Here, the pattern 42 of a wiring, a resist or the like is removed from an area aligned with the bank part 33 by selective etching or the like. Thus, it is possible to shut off light leaked from the projection unit through the surface of the support substrate 4 to the detection unit.

Figure 8:
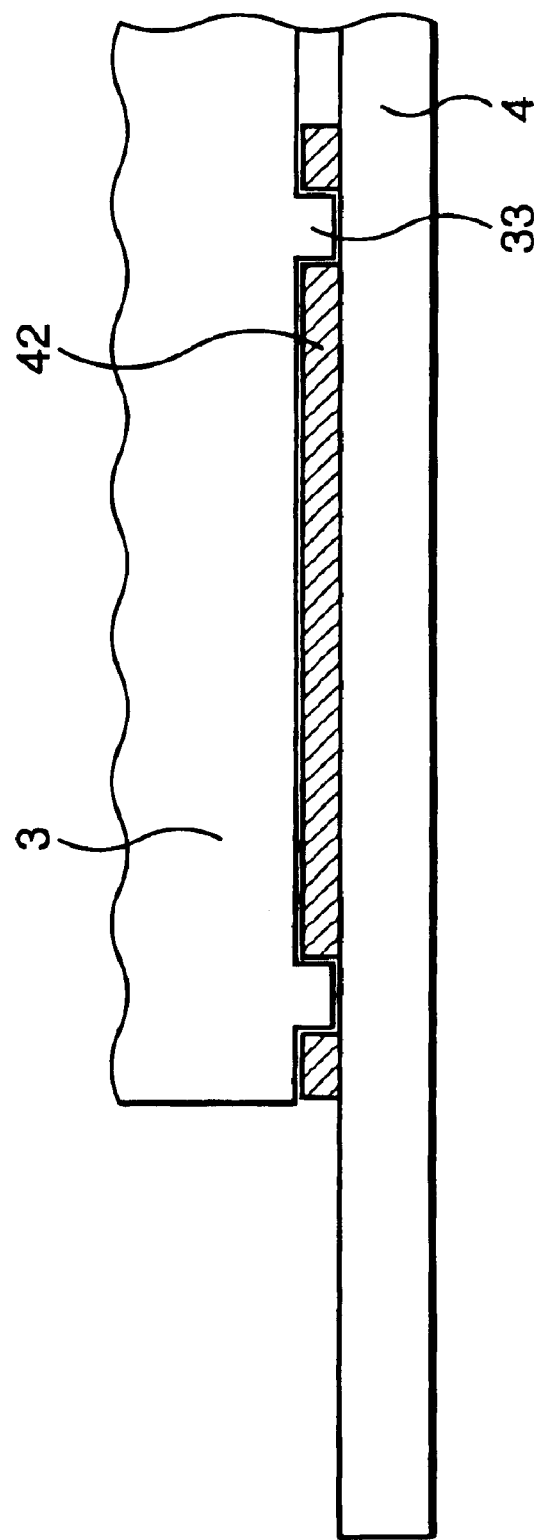
FIG. 8 is a sectional view cut along the line of X—X shown in FIG. 7.

FIG. 8 is a sectional view cut along the line X—X shown in FIG. 7. As described above, the bottom of the holding frame 3 is in contact with the surface of the support substrate 4. The rectangularly shaped bank part 33 is formed on the bottom of the holding frame 3 to surround the light emitting element (not shown). On the other hand, the pattern 42 of a wiring film, a resist film or the like is selectively formed on the surface of the support substrate 4 by etching or the like. This pattern 42 is selectively etched in a rectangular shape so as to just align with the bank part 33. Accordingly, the bank part 33 and the pattern 42 are engaged with each other on a boundary between the holding frame 3 and the support substrate 4, whereby leaked light propagated on the surface of the support substrate 4 can be effectively shut off. As long as at least one of the conductive wiring film and the resin resist film is patterned as shown, a desired blocking effect can be obtained.

Figure 9:
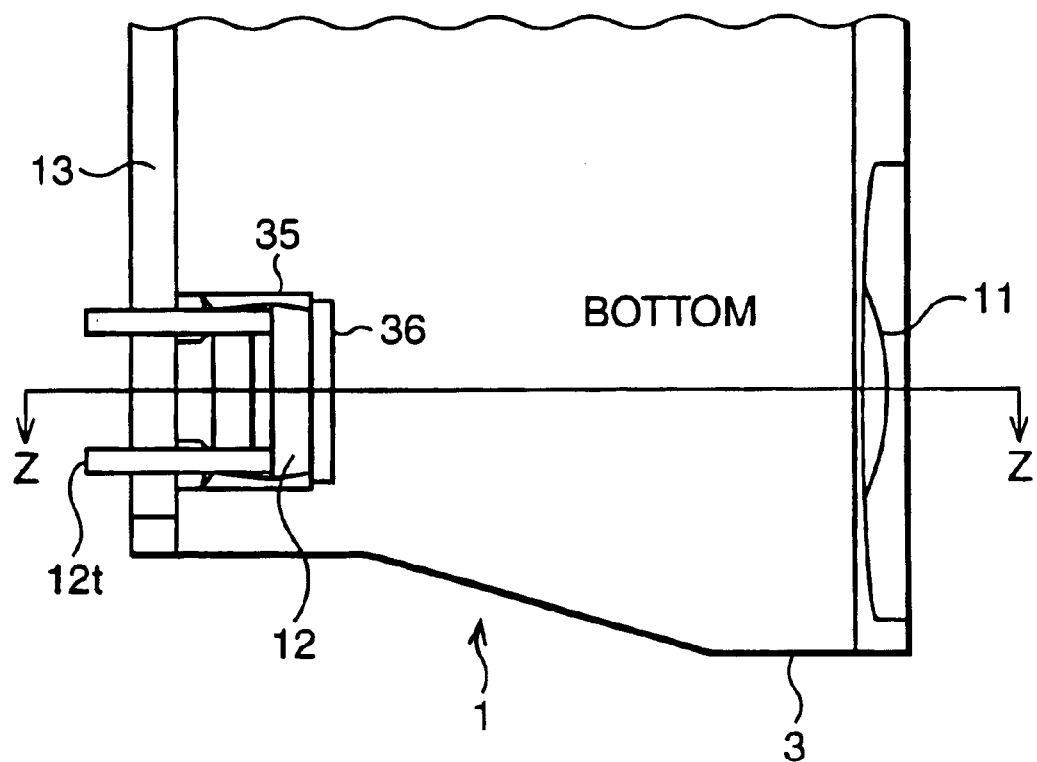
FIG. 9 is a schematic view showing a third aspect of the present invention.

FIG. 9 is a schematic view of the third aspect of the present invention, showing the optical range finder seen from the bottom side. Only the projection unit 1 is partially shown. As described above, on the bottom side of the holding frame 3 which comes in contact with the support substrate, the opening 35 is formed to house the light emitting element 12. A step 36 is disposed in the opening 35. This step 36 becomes a visual positioning guide when the light emitting element 12 is inserted through the opening 35 into the holding frame 3.

Figure 10:
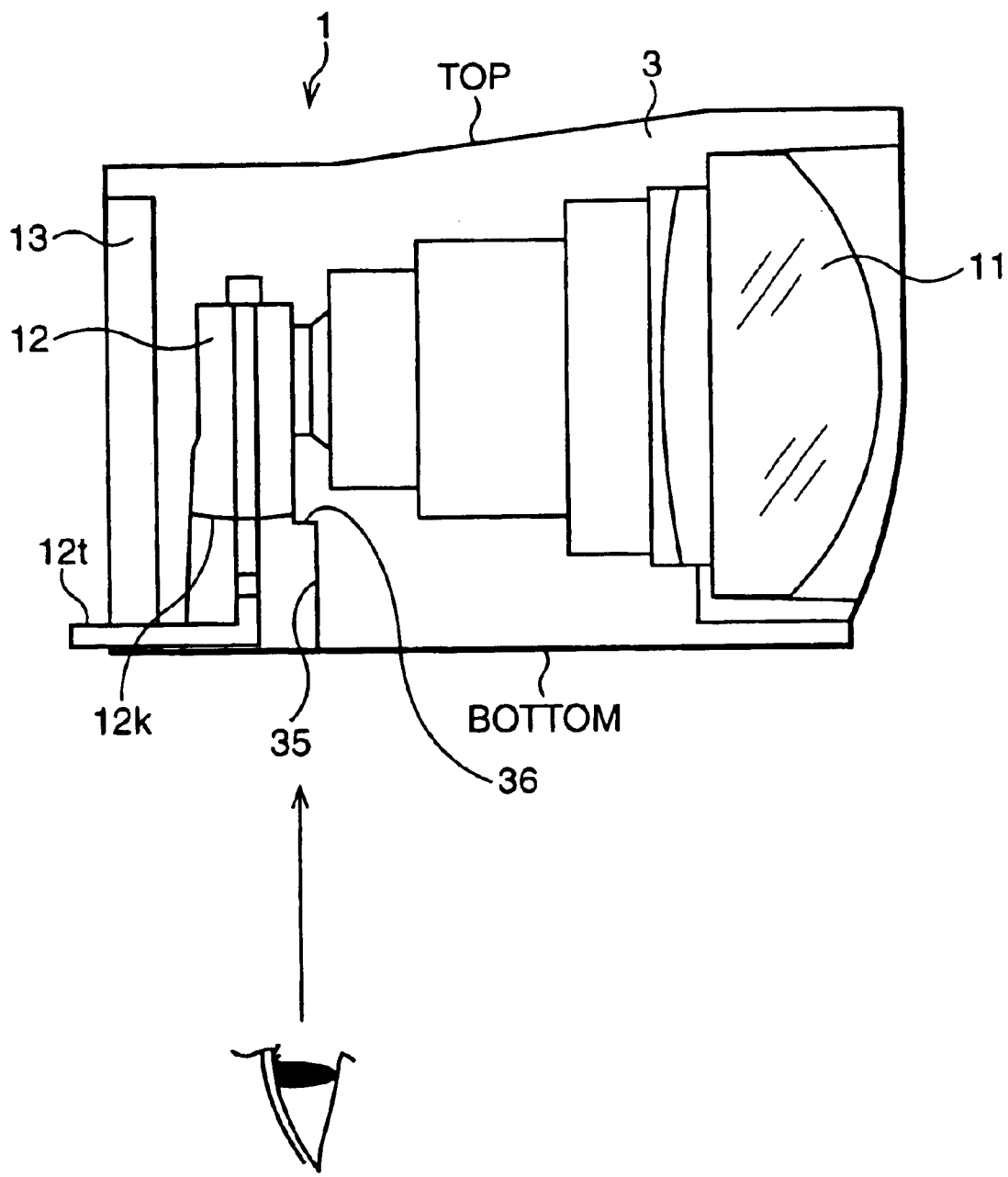
FIG. 10 is a sectional view cut along the line Z—Z shown in FIG. 9.

FIG. 10 is a sectional view cut along the line Z—Z shown in FIG. 9. As shown, the lens 11 is attached to the front side of the holding frame 3, and the backside substrate 13 is fitted on the back side. The opening 35 is formed on the bottom of the holding frame 3 and, further inside, the step 36 is formed for guide positioning. The light emitting element 12 is pushed through the opening 35 into the holding frame 3. At this time, the pair of connection terminals 12t is projected from the back side of the holding frame 3 to be soldered to the support substrate (not shown) which comes in contact with the bottom of the holding frame 3. The light emitting element 12 is made of a molded article, and a lower outer shape is represented by 12k. When the light emitting element 12 is pushed into contact with the holding frame 3, this outer shape 12k is just aligned with the step 36. This aligned state is visually observed, whereby correct positioning of the light emitting element 12 can be checked.

The range finder of the embodiment is provided, on the front of the holding frame, with the lens for more efficiently converging the luminous flux in the detection unit, and the lens for similarly converging the returned luminous flux in the projection unit. However, these components are not always necessary. Needless to say, if necessary converging function can be obtained, other means can be similarly applied to the range finder.

As described above, according to the first aspect of the present invention, the holding frame has the partition wall for separating the detection unit and the projection unit from each other, the end of the partition wall is provided with the tip protruding from the bottom of the holding frame and, in the support substrate, the groove is formed on the surface side which comes in contact with the bottom of the holding frame and is engaged with the tip of the partition wall. A combination of the tip and the groove enables shutting-off of light leaked from the projection unit through the thickness of the support substrate to the detection unit, and has an effect on improvement of measurement accuracy of the optical range finder. According to the second aspect of the present invention, the bank part is formed on the bottom of the holding frame to surround the light emitting element, and the patterns formed on the support substrate are selectively removed from the part aligned with the bank part. Thus, light leaked from the projection unit through the surface of the support substrate to the detection unit can be shut off, which can contribute to improvement of measurement accuracy and reduction of errors of the optical range finder. Further, according to the third aspect of the present invention, the step is formed in the opening as the visual positioning guide when the light emitting element is inserted through the opening formed on the bottom of the holding frame. Thus, positioning of the light emitting element becomes easy and accurate, which can contribute to improvement of measurement accuracy and reduction of errors of the optical range finder.

What is claimed is:

1. An optical range finder for measuring a distance to an object in an optical axis direction, comprising:
   a projection unit for projecting luminous flux to the object located in the optical axis direction;
   a detection unit for receiving the luminous flux returned from the object;
   a holding frame that holds therein the projection unit and the detection unit; and
   a support substrate that supports thereon the holding frame, wherein
      the projection unit comprises a light emitting element for emitting the luminous flux in the optical axis direction, and a backside substrate mounted to the holding frame to shield the light emitting element from a backside,
      the detection unit comprises a light receiving element mounted in the holding frame to receive the luminous flux returned from the object, and another backside substrate mounted to the holding frame to shield the light receiving element from a backside,
      the holding frame has a partition wall for separating the detection unit and the projection unit from each other, an end of the partition wall being provided with a tip protruding from a bottom of the holding frame, and
      the support substrate is formed with a groove in a surface of the support substrate which comes in contact with the bottom of the holding frame, such that the groove can be engaged with the tip of the partition wall so as to block a light leaked from the projection unit through a thickness of the support substrate to the detection unit by a combination of the tip and the groove.

2. An optical range finder for measuring a distance to an object in an optical axis direction, comprising:
   a projection unit for projecting luminous flux to the object located in the optical axis direction;
   a detection unit for receiving the luminous flux returned from the object;
   a holding frame that holds therein the projection unit and the detection unit; and
   a support substrate that supports thereon the holding frame, wherein
      the projection unit comprises a light emitting element for emitting the luminous flux in the optical axis direction, and a backside substrate mounted to the holding frame to shield the light emitting element from a backside,
      the detection unit comprises a light receiving element mounted in the holding frame to receive the luminous flux returned from the object, and another backside substrate mounted to the holding frame to shield the light receiving element from a backside,
      the holding frame has a bottom which comes in contact with a surface of the support frame, and a bank part protruding from the bottom to surround the light emitting element housed in the holding frame, and
      the support substrate has a wiring pattern formed on the surface of the support substrate for electrical connection to the projection unit and the detection unit and a resist pattern selectively formed on the surface of the support substrate, such that at least one of the wiring pattern and the resist pattern is removed from an area aligned with the bank part so as to shut off a leak light traveling the surface of the support substrate from the projection unit to the detection unit.

3. An optical range finder for measuring a distance to an object in an optical axis direction, comprising:
   a projection unit for projecting luminous flux to the object located in the optical axis direction;
   a detection unit for receiving the luminous flux returned from the object;
   a holding frame that holds therein the projection unit and the detection unit; and
   a support substrate that supports thereon the holding frame, wherein
      the projection unit comprises a light emitting element for emitting the luminous flux in the optical axis direction, and a backside substrate mounted to the holding frame to shield the light emitting element from a backside,
      the detection unit comprises a light receiving element mounted in the holding frame to receive the luminous flux returned from the object, and another backside substrate mounted to the holding frame to shield the light receiving element from a backside, and
      the holding frame is formed with an opening in a bottom of the holding frame which comes in contact with a surface of the support, the opening being provided for receiving therein the light emitting element and being formed with a guide part for serving as a visual positioning guide when the light emitting element is inserted through the opening into the holding frame.

* * * * *